US011914204B2

(12) United States Patent
Tokunari et al.

(10) Patent No.: US 11,914,204 B2
(45) Date of Patent: Feb. 27, 2024

(54) OPTICAL CONNECTOR DEVICE WITH LID

(71) Applicant: International Business Machines Corporation, Armonk, NY (US)

(72) Inventors: Masao Tokunari, Yokohama (JP); Koji Masuda, Tokyo (JP); Hsiang Han Hsu, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 112 days.

(21) Appl. No.: 17/060,205

(22) Filed: Oct. 1, 2020

(65) Prior Publication Data

US 2022/0107478 A1    Apr. 7, 2022

(51) Int. Cl.
*G02B 6/38*     (2006.01)
*G02B 6/42*     (2006.01)

(52) U.S. Cl.
CPC ......... *G02B 6/4292* (2013.01); *G02B 6/3825* (2013.01); *G02B 6/3853* (2013.01); *G02B 6/423* (2013.01)

(58) Field of Classification Search
CPC ................................ G02B 6/38; G02B 6/423
USPC ............................................................ 385/89
See application file for complete search history.

(56) References Cited

U.S. PATENT DOCUMENTS

| 5,050,953 | A |   | 9/1991 | Anderson |             |
|-----------|---|---|--------|----------|-------------|
| 5,337,388 | A | * | 8/1994 | Jacobowitz | G02B 6/3897 |
|           |   |   |        |          | 385/76      |
| 5,548,677 | A | * | 8/1996 | Kakii    | G02B 6/3885 |
|           |   |   |        |          | 385/83      |
| 6,257,741 | B1| * | 7/2001 | Williams | A61B 1/00126|
|           |   |   |        |          | 362/310     |
| 6,491,446 | B1| * | 12/2002| Kryzak   | G02B 6/4292 |
|           |   |   |        |          | 385/88      |

(Continued)

FOREIGN PATENT DOCUMENTS

JP     2005049389 A  *  2/2005
JP       3929755 B2  *  6/2007

(Continued)

OTHER PUBLICATIONS

International Search Report and Written Opinion for Application PCT/EP2021/075746, dated Dec. 20, 2021, 13 pages.

(Continued)

*Primary Examiner* — Kaveh C Kianni
(74) *Attorney, Agent, or Firm* — Jeffrey M. Ingalls

(57) ABSTRACT

An optical connector device is provided. The optical connector device includes a semiconductor package including a receptacle and a lid. The optical connector device also included an adapter attached to the lid of the semiconductor package, and a connector removably attached to the adapter. The adapter includes a convex part adapted to fit into an adapter opening of the lid, an adapter recess adapted to accommodate at least a portion of the connector, and a first retainer in the adapter recess to removably attach the connector to the adapter at a predetermined position. The connector includes an optical fiber array corresponding to the receptacle and extending in a vertical direction with respect to a plane of the semiconductor package, a second retainer used in conjunction with the first retainer, and a biasing member to bias a portion of the connector toward the semiconductor package.

11 Claims, 14 Drawing Sheets

(56) References Cited

U.S. PATENT DOCUMENTS

| | | | |
|---|---|---|---|
| 6,632,023 B1 | 10/2003 | Ogawa et al. | |
| 6,641,310 B2 * | 11/2003 | Williams | G02B 6/43 385/59 |
| 8,317,411 B2 | 11/2012 | Fujiwara et al. | |
| 2002/0025125 A1 * | 2/2002 | Williams | G02B 6/43 385/139 |
| 2003/0007750 A1 * | 1/2003 | Kryzak | G02B 6/4249 385/52 |
| 2007/0223865 A1 * | 9/2007 | Lu | G02B 6/4292 385/88 |
| 2010/0074581 A1 * | 3/2010 | Tanobe | G02B 6/4201 361/749 |
| 2012/0082416 A1 | 4/2012 | Katoh | |
| 2013/0259427 A1 | 10/2013 | Lam et al. | |
| 2019/0391350 A1 * | 12/2019 | Evans | G02B 6/4292 |

FOREIGN PATENT DOCUMENTS

| | | | | |
|---|---|---|---|---|
| WO | WO-2011007909 A1 * | 1/2011 | | G02B 6/262 |
| WO | WO-2011145785 A1 * | 11/2011 | | G02B 6/4202 |

OTHER PUBLICATIONS

"UltraSpring Compression Coil Springs", Part C231, MiSUMi, Configured to Save Time, 6 pages, printed Jun. 4, 2020. https://us.misumi-ec.com/vona2/detail/221000016945/.

"UltraSpring Compression Coil Springs", Part C251, MiSUMi, Configured to Save Time, 6 pages, printed Jun. 4, 2020. https://us.misumi-ec.com/vona2/detail/221000016945/.

* cited by examiner

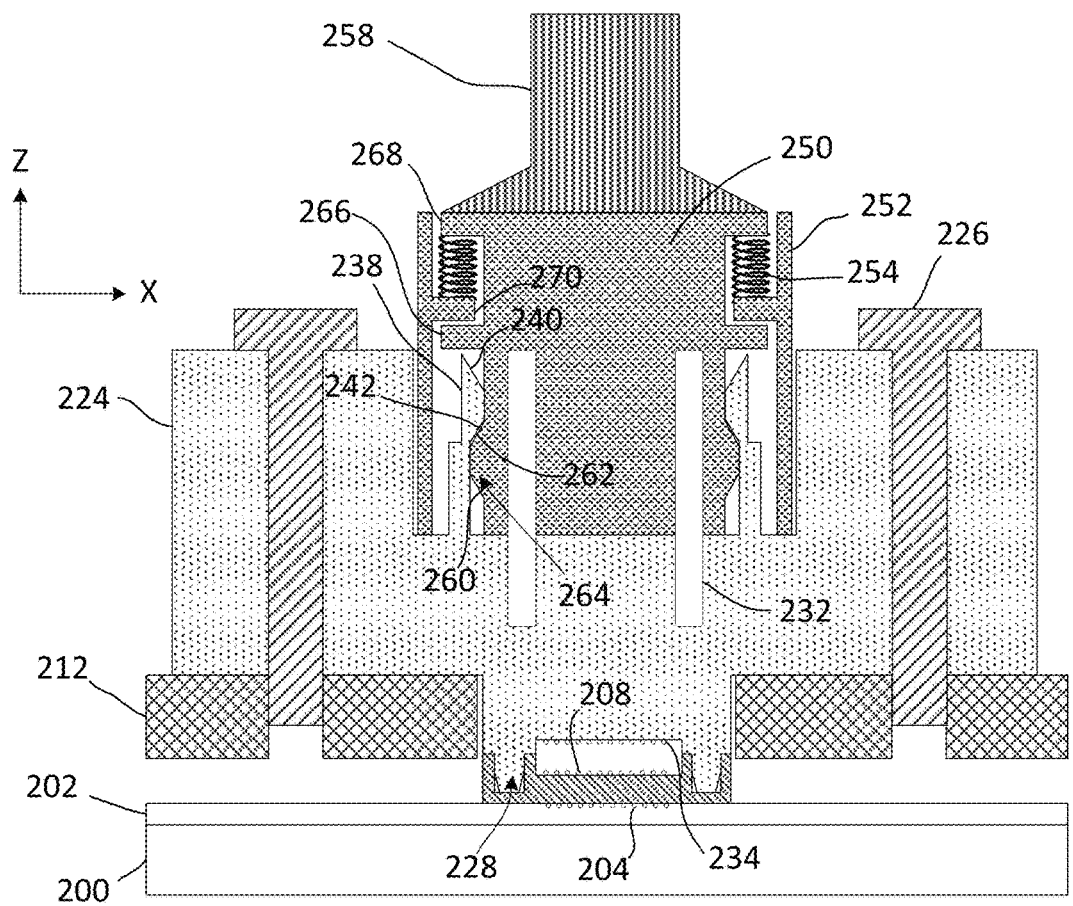
FIG. 2H
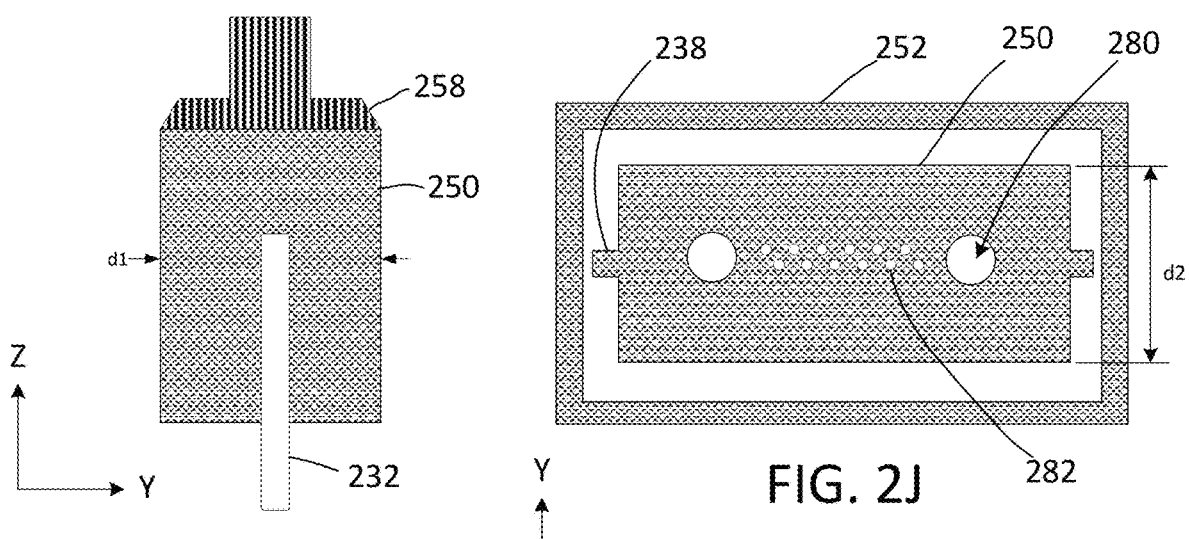
FIG. 2I
FIG. 2J

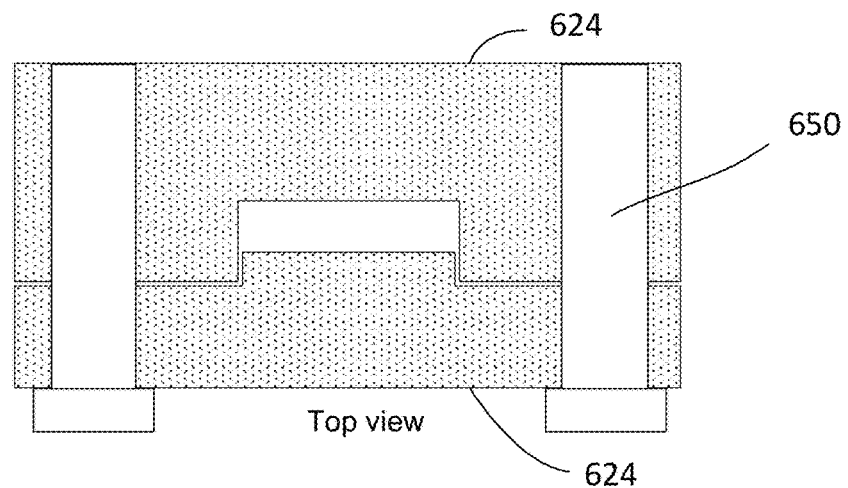
Top view
FIG. 6A
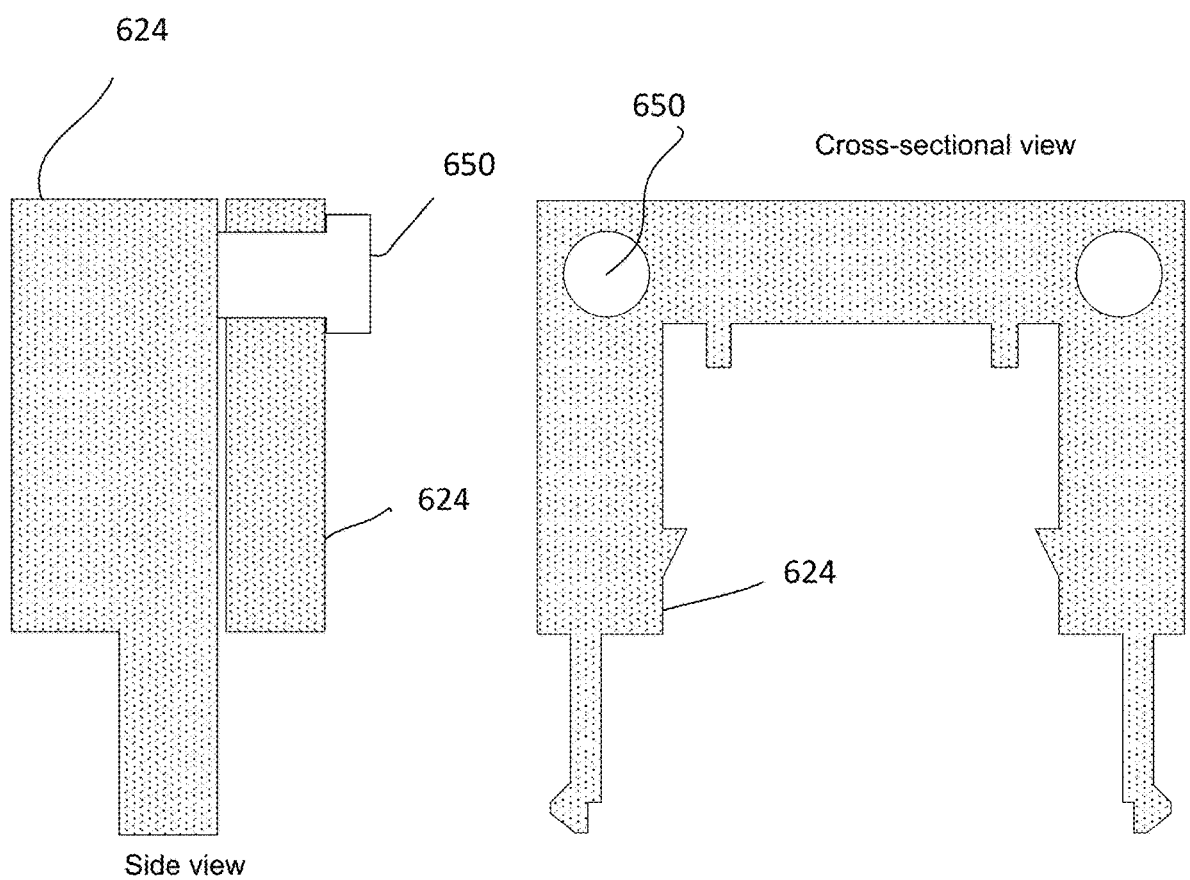
Side view
FIG. 6B
FIG. 6C

OPTICAL CONNECTOR DEVICE WITH LID

BACKGROUND

The present disclosure relates to the electrical, electronic and computer fields. In particular, the present disclosure relates to optical connectors for optical Multi-Chip-Modules (MCMs), the optical connectors including a lens array that may be used for connecting optical waveguides and optical fibers from one module to another.

SUMMARY

Embodiments of the present disclosure relate to an optical connector device. The optical connector device includes a semiconductor package including a receptacle and a lid. The optical connector device also include an adapter attached to the lid of the semiconductor package, and a connector removably attached to the adapter. The adapter includes a convex part adapted to fit into an adapter opening of the lid, an adapter recess adapted to accommodate at least a portion of the connector, and a first retainer in the adapter recess to removably attach the connector to the adapter at a predetermined position. The connector includes an optical fiber array corresponding to the receptacle and extending in a vertical direction with respect to a plane of the semiconductor package, a second retainer used in conjunction with the first retainer, and a biasing member to bias a portion of the connector toward the semiconductor package.

Other embodiments of the present disclosure relate to an optical connector device. The optical connector device includes a semiconductor package including a receptacle and a lid, a connector that is attachable to the receptacle, an adapter movably coupled to the connector and removably attached to the lid, and a biasing member positioned between the connector and the adapter. The biasing member is adapted to bias the connector toward the semiconductor package. The connector includes an optical fiber array corresponding to the receptacle and extending in a vertical direction with respect to a plane of the semiconductor package, and a convex part adapted to fit into a connector opening of the lid. Also, the adapter includes a first retainer adapted to fit into a first retainer opening of the lid.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, explain the principles of the disclosure. The drawings are only illustrative of certain embodiments and do not limit the disclosure.

FIG. 2H is a cross-sectional view of the optical connector device of FIG. 2E at a subsequent stage of the manufacture or assembly process, according to embodiments.

FIG. 2I is a side view of the connector of the optical connector device of FIG. 2H, according to embodiments.

FIG. 2J is a bottom view of the connector of the optical connector device shown in FIG. 2H, according to embodiments.

FIGS. 3H-J show the attachment of the adapter and the connector to the lid of the optical connector device shown in FIG. 3A in three stages, according to embodiments.

FIGS. 6A-6C are a top view, a side view, and a cross-sectional view, respectively, of an adapter of an optical connector device, according to embodiments.

Figure 1:
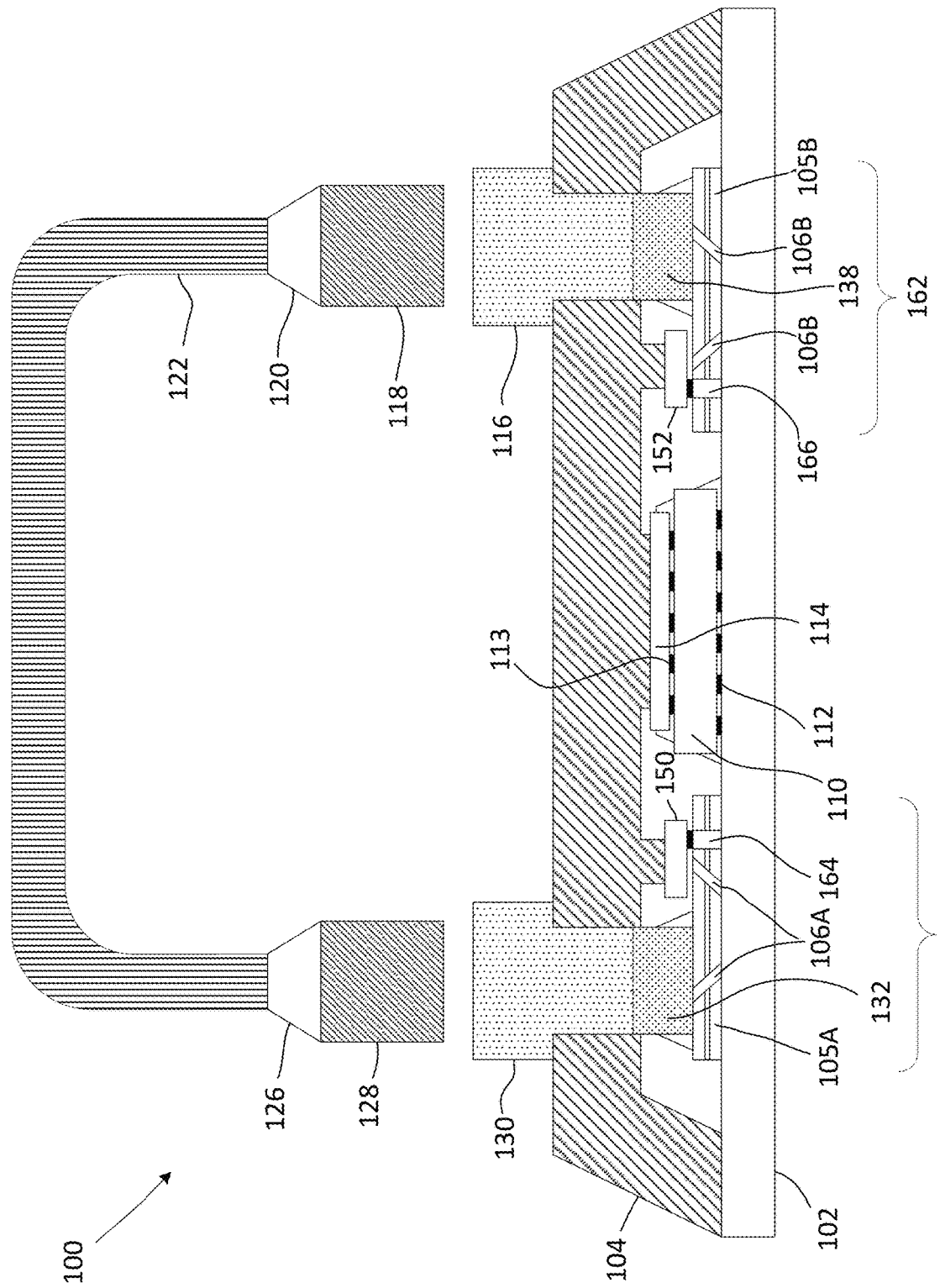
FIG. 1 is a cross-sectional view of the basic configuration of a multi-chip-module (MCM) optical fiber connection device, according to embodiments.

It should be appreciated that elements in the figures are illustrated for simplicity and clarity. Well-understood elements that may be useful or necessary in a commercially feasible embodiment may not be shown for the sake of simplicity and to aid in the understanding of the illustrated embodiments.

DETAILED DESCRIPTION

The present disclosure describes optical connector devices. In particular, the embodiments disclosed herein include optical connector devices that include different combinations of adapters and connectors. The connectors include an optical fiber bundle array, and the adapters aid in accurately and flexibly fixing the connectors to the semiconductor packages attached to a substrate. Each of the embodiments include components of the optical connector device that allows for both a course alignment and a fine alignment of the adapters and connectors to the receptacle of the semiconductor package. Moreover, the embodiments allow for a reduction in the stress that may be applied to the optical fibers of the optical fiber bundle array, or the stress that is applied to the connectors themselves. In related devices, there may be an effect that the connectors can be broken by the tension from the optical fibers. The adapters of the present embodiments may lessen these effects.

Various embodiments of the present disclosure are described herein with reference to the related drawings. Alternative embodiments can be devised without departing from the scope of the present disclosure. It is noted that various connections and positional relationships (e.g., over, below, adjacent, etc.) are set forth between elements in the following description and in the drawings. These connections and/or positional relationships, unless specified otherwise, can be direct or indirect, and the present disclosure is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

For purposes of the description hereinafter, the terms "upper," "lower," "right," "left," "vertical," "horizontal," "top," "bottom," and derivatives thereof shall relate to the described structures and methods, as oriented in the drawing figures. The terms "overlying," "atop," "on top," "positioned on" or "positioned atop" mean that a first element, such as a first structure, is present on a second element, such as a second structure, wherein intervening elements such as an interface structure can be present between the first element and the second element. The term "direct contact" means that a first element, such as a first structure, and a second element, such as a second structure, are connected without any intermediary conducting, insulating or semiconductor layers at the interface of the two elements. It should be noted, the term "selective to," such as, for example, "a first element selective to a second element," means that a first element can be etched, and the second element can act as an etch stop.

Referring now to the drawings in which like numerals represent the same or similar elements and initially to FIG. 1, an example of a general conceptual configuration of an MCM optical fiber connection device 100 is illustrated, according to embodiments. As shown in FIG. 1, a substrate 102 (e.g., an organic substrate) is provided that may serve as a supporting base structure for the remaining components of the MCM optical fiber connection device 100. A lid 104 (e.g., a heat sink lid) covers various components of the MCM optical fiber connection device 100.

As shown in FIG. 1, in certain embodiments, the MCM optical fiber connection device 100 may include a chip scale package 110 (CSP) that is connected to the organic substrate 102 (or other circuitry that is electrically connected to the organic substrate 102) by a first plurality of bonding pads 112 (e.g., solder bumps). Similarly, a logic chip 114 (e.g., a central processing unit or CPU) may be connected to the CSP 110 by a second plurality of bonding pads 113. In certain embodiments, the lid 104 covers the CSP 110 and the logic chip 114.

As also shown in FIG. 1, for the MCM optical fiber connection device 100, there is a light emitting section 160 and a light receiving section 162. The light emitting section 160 may include a light emitting device 150 (e.g., one or more vertical cavity surface emitting lasers or VCSELs, or any other suitable light emitting devices). The light receiving section 162 may include a light receiving device 152 (e.g., one or more photodiodes or PDs, or any other suitable light receiving devices). In general, in certain embodiments, light that is generated in the light emitting device 150 travels through a first optical waveguide 105A (i.e., a light guide plate) with the aid of first reflecting elements 106A. The reflected light travels upwards to a first receptacle 132, then through a first adapter 130, then through a first connector 128, then through a first connector cap 126 to an optical fiber array 122. The light travels through the optical fiber array 122 from the light emitting section 160 side to the light receiving section 162 side. In particular, the light travels through a second connector cap 120, then through a second connector 118, then through a second adapter 116, then through a second receptacle 138. Light that has travelled through the second receptacle is received by a second optical waveguide 105B (i.e., a light guide plate), and travels through the second optical waveguide 105B with the aid of second reflecting elements 106B to the light receiving device 152. In certain embodiments, the lid 104 has holes (or bores, or apertures) that accommodate at least the first adapter 130 and the second adapter 116. In certain embodiments, the holes of the lid 104 may also accommodate at least portions of the first receptacle 132 and the second receptacle 138. Thus, in the MCM optical fiber connection device 100, the light emitting section 160 and the light receiving section 162 enables transmission from one side to the other via the optical fiber array 122 and the other components discussed above. It should be appreciated that FIG. 1 is merely a conceptual diagram of several of the components of an example MCM optical fiber connection device 100 showing how optical connectors may be used to transmit light, and there may be additional components, or certain of the components shown in FIG. 1 may not need to be included. Moreover, the various components shown in FIG. 1 may not be drawn to scale.

Figure 2A:
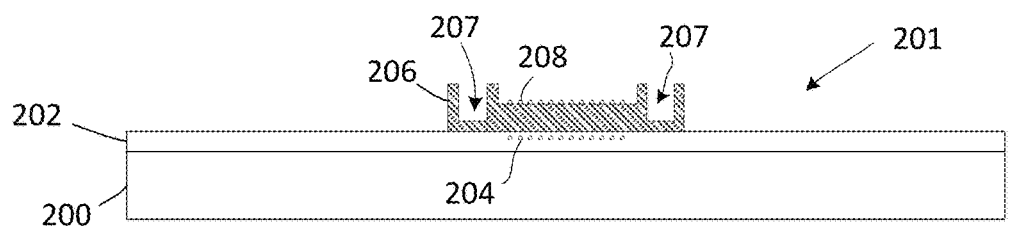
FIG. 2A is a cross-sectional view of an optical connector device at an intermediate stage of the manufacture or assembly process, according to embodiments.

Referring now to FIGS. 2A-2J, and initially to FIG. 2A, a cross-sectional view of an embodiment of an optical connector device 201 at an intermediate stage of the manufacture or assembly process is shown. As shown in FIG. 2A, a substrate 200 is provided. In certain embodiments, the substrate 200 may be comprised of one or more organic materials. An optical waveguide 202 is provided on the substrate 200. The optical waveguide 202 may be similar to or different from the optical waveguides 105A and 105B discussed above with respect to FIG. 1. A first optical fiber connection array 204 is provided on or in the optical waveguide 202. The first optical fiber connection array 204 may include, for example, an array of 12 or 24 different optical fiber lenses for receiving or transmitting light through the optical waveguide 202. In other words, light may pass through the optical fiber connection array 204 lenses from the top side or the bottom side.

Figure 2B:
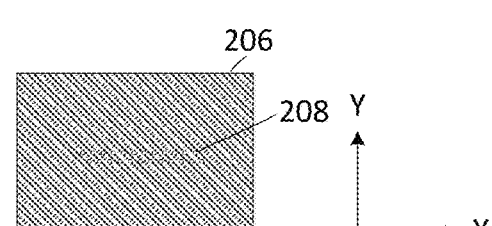
FIG. 2B is a top view of the receptacle of the optical connector device shown in FIG. 2A, according to embodiments.

As shown in FIG. 2A, a receptacle 206 is provided on top of the optical waveguide 202. Thus, in certain examples, the receptacle 206 is attached on the waveguide-integrated organic substrate 200 and is fixed thereto using, for example, an adhesive. In certain embodiments, the receptacle 206 includes alignment recesses 207 that are configured to receive alignment pins from an adapter 224, as discussed in further detail below. The receptacle 206 also includes a second optical fiber connection array 208. The second optical fiber connection array 208 has the same number and pattern of lenses as the first optical fiber connection array 204 discussed above with respect to the optical waveguide. As shown in FIG. 2B, a top view of the receptacle 206 is shown that includes the second optical fiber connection array 208. In the example shown in FIG. 2B, the second optical fiber connection array 208 includes a 2×12 array of lenses. However, it should be appreciated that any suitably sized array may be used.

Figure 2C:
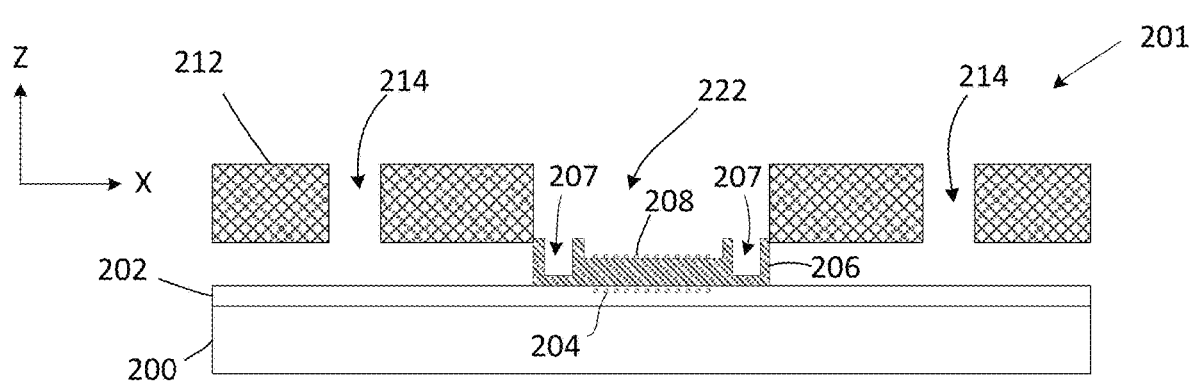
FIG. 2C is a cross-sectional view of the optical connector device of FIG. 2A at a subsequent stage of the manufacture or assembly process, according to embodiments.
Figure 2D:
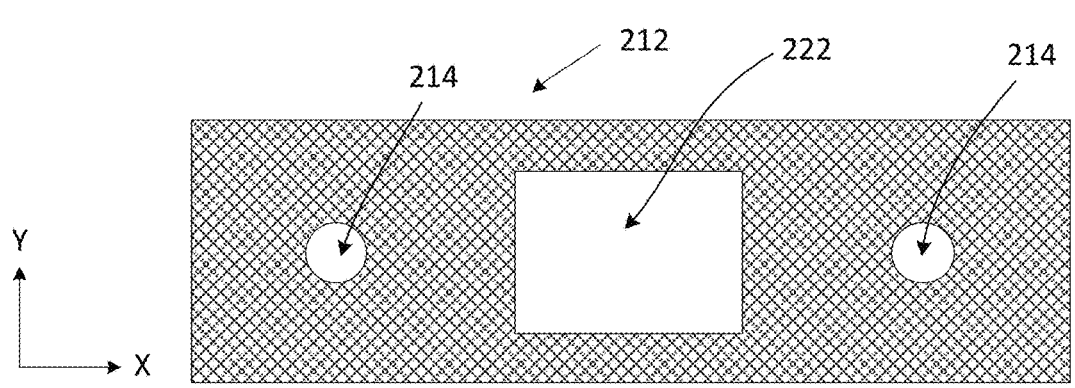
FIG. 2D is a top view of the lid of the optical connector device shown in FIG. 2C, according to embodiments.

Referring now to FIG. 2C, a cross-sectional view of the embodiment of the optical connector device 201 shown in FIG. 2A is shown at a subsequent stage of the manufacture or assembly process. A lid 212 is attached to the substrate 200 using an adhesive. As shown in FIG. 2D, a top view of the lid 212 from FIG. 2C is shown, and the lid 212 includes a first opening 222 that corresponds to the dimensions of the receptacle 206. The lid 212 also includes, for example, two attachment holes 214. In this example, the attachment holes 214 are on opposite sides of the first opening 222. As discussed in further detail below, the attachment holes 214 are configured to receive screws that are used to fix an adapter 224 to the lid 212.

Figure 2E:
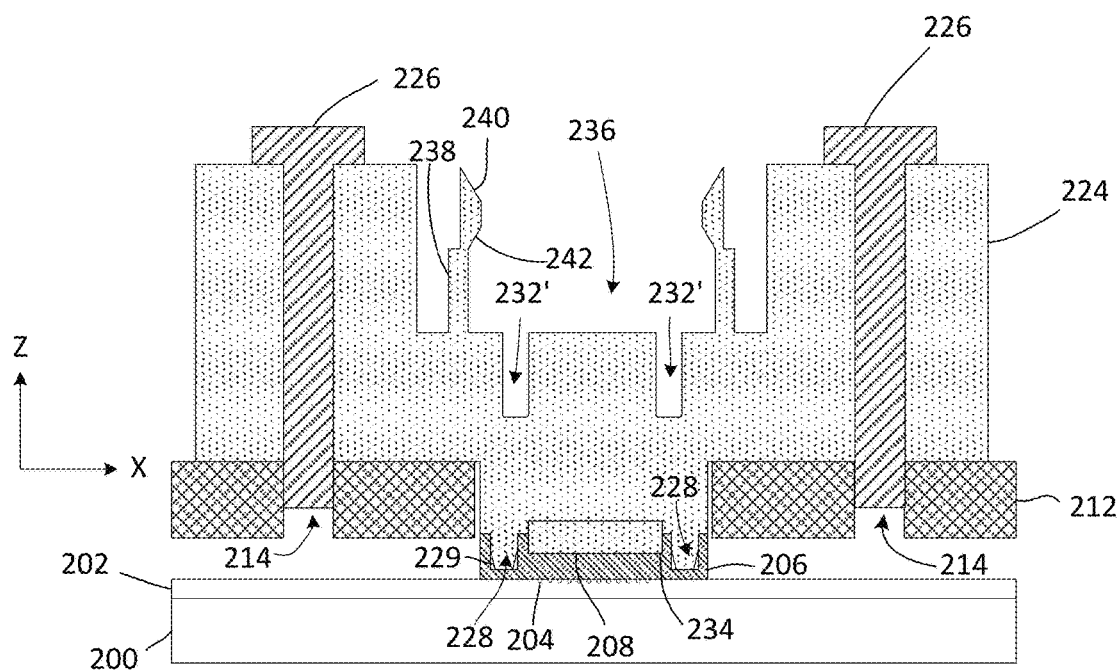
FIG. 2E is a cross-sectional view of the optical connector device of FIG. 2C at a subsequent stage of the manufacture or assembly process, according to embodiments.

Referring now to FIG. 2E, a cross-sectional view of the optical connector device of FIG. 2C is shown at a subsequent stage of the manufacture or assembly process, according to embodiments. As shown in FIG. 2E, an adapter 224 is fitted to the receptacle 206 and screwed to the lid 212. In particular, the adapter 224 includes two studs 228 that fit into the alignment recesses 207 of the receptacle 206. As shown in the example of FIG. 2E, the studs 228 may have a tapered portion 229 (or tapered end) that may allow the studs 228 to slide easier into the alignment recesses 207 of the receptacle 206. It should be appreciated that the studs 228 may have any suitable shape or profile that allows for ease of connection between the receptacle 206 and the adapter 224, as well as allowing for fine alignment therebetween. Thus, after the adapter 224 is fitted to the receptacle 206 (i.e., by the studs 228 being inserted into the alignment recesses 207), a third optical fiber connection array 234 (i.e., which is a part of the adapter 224) is aligned with the first optical fiber connection array 204 and the second optical fiber connection array 208. Thus, the three optical fiber connection arrays are all aligned with each other to allow for light to pass from the optical waveguide 202, through the receptacle 206, and through the adapter 224. As also shown in FIG. 2E, screws 226 are used to attach the adapter 224 to the lid 212.

As shown in FIG. 2E, in certain embodiments, the adapter 224 includes a connector recess 236 that enable attachment of a connector, as discussed in further detail below. Two guide pin recesses 232' are formed into the adapter 224 to receive two guide pins 232 (see, FIG. 2I). The guide pins 232 may be comprised of a metal material (or any other suitable material), and may have a diameter of, for example, about 0.7 mm (or any other suitable diameter). As shown in FIG. 2E, the adapter 224 includes two plate springs 238 that extend upwardly from the connector recess 236. The plate springs 238 are configured in any suitable manner to guide the insertion and retention of a connector, which is discussed in further detail below. In this example, the plate springs 238 include a retaining portion that has a slanted upper surface 240 for guiding the connector into the connector recess 236 of the adapter 224. In this example, the retaining portion of the plate springs 238 also include a slanted lower surface 242 that functions as a detent or retaining structure that inhibits the removal of the connector once it is inserted and connected to the adapter 224. It should be appreciated that this particular shape of the plate springs 238 should not be construed as limiting, and any suitable shape that facilitates both insertion and retention of the connector (see, FIG. 2H, connector 250) may be used. For example, instead of the slanted upper surface 240 and slanted lower surface 242 of the plate springs 238, there may be a curved surface profile on the insides of the plate springs 238.

Figure 2F:
FIG. 2F is a side view of the adapter shown in FIG. 2E, according to embodiments.

Referring now to FIG. 2F, this figure shows a cross-sectional side view of the adapter 224 shown in FIG. 2E, according to embodiments. As shown in FIG. 2F, the adapter 224 includes the studs 228 extending from a lower side of the adapter 224. The adapter 224 also includes a lower portion 244 having a width in the Y-direction that generally corresponds to the width of the first opening 222 of the lid 212 in the Y-direction (i.e., a width of the lower portion 244 is slightly less than the width of the first opening 222 so that this lower portion 244 can fit into the first opening 222), and a length in the X-direction that generally corresponds to the length of the first opening 222 of the lid 212 in the X-direction (i.e., a length of the lower portion 244 is slightly less than the length of the first opening 222 so that this lower portion 244 can fit into the first opening 222). As also shown in FIG. 2F, the adapter 224 includes an upper portion 246 having a width in the Y-direction that is greater than the width of the first opening 22 in the Y-direction. Thus, the bottom surface of the studs 228 (of the adapter 224) contact (or are close to) a lower surface of the receptacle 206 in the alignment recesses 207 thereof, and the intermediate lower surface 247 of the adapter 224 contacts the upper surface of the lid 212.

Figure 2G:
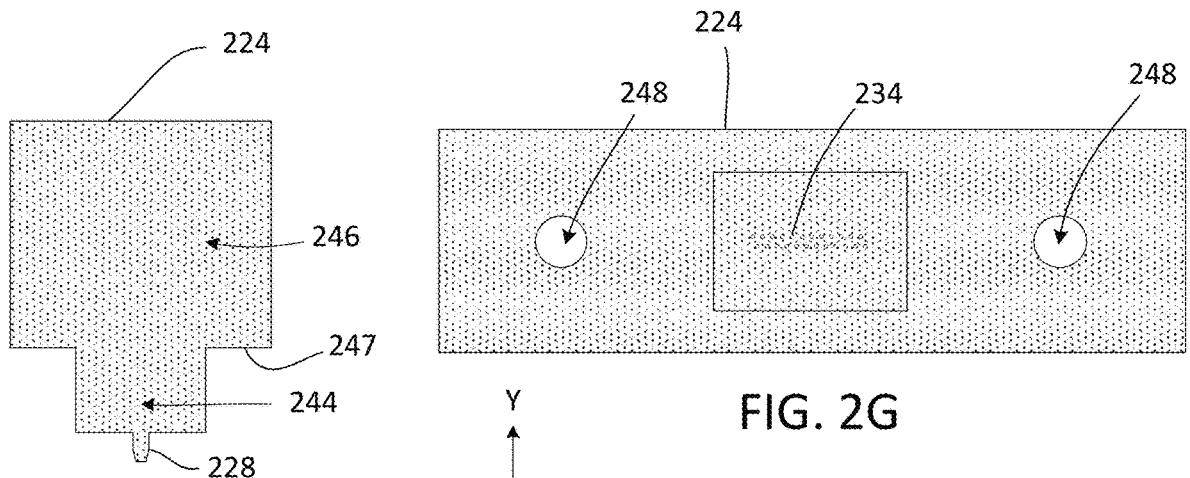
FIG. 2G is a bottom view of the adapter shown in FIG. 2E, according to embodiments.

Referring now to FIG. 2G, this figure shows a bottom view of the adapter 224 shown in FIG. 2E, according to embodiments. screw holes 248 are provided in the adapter 224 to accommodate the screws 226 shown in FIG. 2E. Also, the third optical fiber connection array 234 is shown. It should be appreciated that in certain embodiments, the diameters of the screw holes 248 are slightly larger than the diameter of the screws 226 as the screws 226 are not needed for any fine alignment of the adapter 224 relative to the receptacle 206 (i.e., this fine alignment is accomplished with the studs 228 of the adapter 224 and the alignment recesses 207 of the receptacle 206).

Referring now to FIG. 2H, a cross-sectional view of a connector 250 for the optical connector device 201 is shown, according to embodiments. As shown in FIG. 2H, a connector 250 is fitted to the adapter 224 with the guide pins 232 (i.e., into the connector recess. In certain embodiments, the connector 250 includes a slider 252 that is movably coupled to the main body of the connector 250. The connector 250 includes springs 254 that bias the slider 252 away from the main body of the connector 250 in a vertical Z-direction. The main body of the connector 250 also includes a first main body protrusion 264 including a first lower slanted surface 260, and a second upper slanted surface 262. When the connector 250 is attached to the adapter 224, the first lower slanted surface 260 of the connector 250 initially contacts the slanted upper surface 240 of the plate springs 238. When the connector 250 is moved downward after this initial contact, the plate springs 238 are urged outward until the connector 250 snaps into place into the connector recess 236 of the adapter 224. As shown in FIG. 2H, when the connector 250 is connected to the adapter 224, the plate springs 238 snap back into place and the slanted lower surface 242 of the plate springs 238 contacts (or is near to) the second upper slanted surface 262 of the first main body protrusion 264 of the connector 250. Thus, the plate springs 238 function as a detent to keep the connector 250 attached to the adapter 224.

As also shown in FIG. 2H, once the connector 250 is snapped into place, the springs 254 urge the slider 252 in a downward direction. To remove the connector 250, the slider 252 may be pulled in an upward direction. As the connector 250 and slider 252 are pulled upwards, the plate spring 238 are urged outward to release the connector 250 from the adapter 224. A second main body protrusion 266 of the connector 250 extends outward from the connector 250 and is positioned above the plate springs 238. The springs 254 are positioned between a first slider protrusion 270 of the slider 252 and a third main body protrusion 268 of the connector 250. Although not shown in FIG. 2H, when the connector 250 and slider 252 are not mounted to the adapter 224, the springs 254 may bias the slider 252 such that the first slider protrusion 270 contacts the second main body protrusion 266 of the connector 250. However, as shown in FIG. 2H, when the connector 250 and slider 252 are mounted to the adapter 224, there may be a slight gap between the first slider protrusion 270 and the second main body protrusion 266 of the connector 250. As also shown in FIG. 2H, an optical fiber bundle 258 is connected to the top of the connector 250. This optical fiber bundle 258 may be the same or similar to the optical fiber array 122 discussed above with respect to FIG. 1.

Referring now to FIG. 2I, this figure shows a cross-sectional side view of the connector 250 of the optical connector device shown in FIG. 2H, according to embodiments. The two guide pins 232 are fitted into recessed in the connector 250. FIG. 2J shows a bottom view of the connector 250 of the optical connector device shown in FIG. 2H, according to embodiments. In certain embodiments, a first dimension d1 (e.g., 5.2 mm) of the connector 250 may be larger than a second dimension d2 (e.g., 3.2 mm) of the connector 250. In other embodiments, the relative dimensions may be different. As shown in FIG. 2J, connector holes 280 are provided in the body of the connector 250, and they accommodate the guide pins 232. In other words, the guide pins 232 enable a fine alignment between the adapter 224 and the connector 250. As mentioned above, the studs 228 of the adapter 224 and the alignment recesses 207 of the receptacle 206 enable a fine alignment between the adapter 224 and the receptacle 206. Therefore, fine alignment may be realized between all three of the receptacle 206, the adapter 224 and the connector 250 such that first optical fiber connection array 204, the second optical fiber connection array 208, the third optical fiber connection array 234, and a fourth optical fiber connection array 282 (see, FIG. 2J) of the connector 250 are all aligned to each other.

Figure 3A:
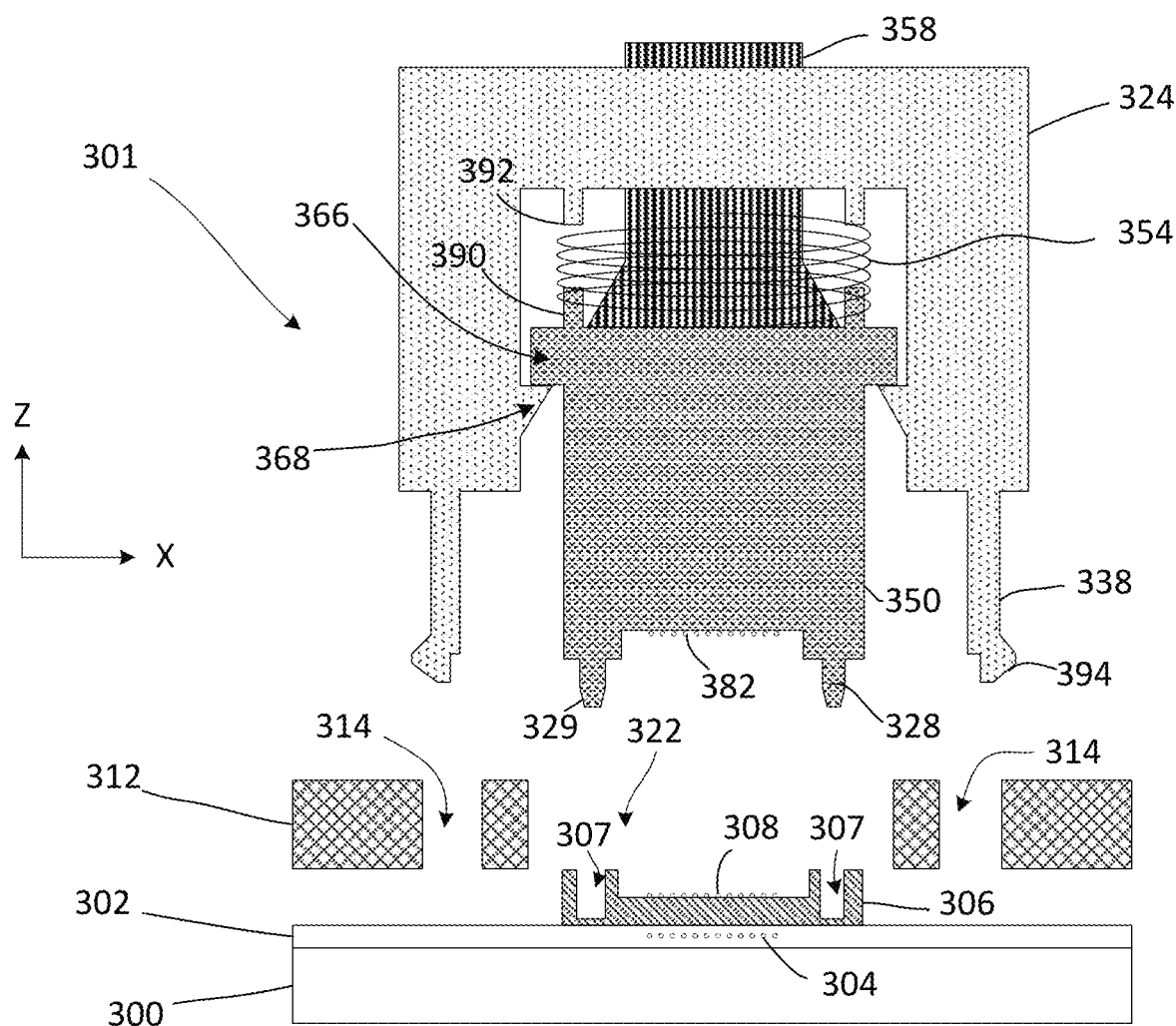
FIG. 3A is a cross-sectional view of an optical connector device at an intermediate stage of the manufacture or assembly process, according to embodiments.

Referring now to FIGS. 3A-3J, and initially to FIG. 3A, a cross-sectional view of an embodiment of an optical connector device 301 at an intermediate stage of the manufacture or assembly process is shown. In this embodiment, in contrast to the embodiment described above with respect to FIGS. 2A-2J, the connector is directly attached to and aligned with the receptacle (i.e., rather than the adapter). Also, in this embodiment, in contrast to the first embodiment described above with respect to FIGS. 2A-2J, the adapter is mounted on the outside of the connector (i.e., rather than the connector being on the outside of the adapter). Moreover, the adapter does not include a fiber optic array (i.e., the optical connector device only includes a total of three fiber optic arrays as compared to the four fiber optic arrays of the first embodiment.

As shown in FIG. 3A, a substrate 300 is provided. In certain embodiments, the substrate 300 may be comprised of one or more organic materials. An optical waveguide 302 is provided on the substrate 300. The optical waveguide 302 may be similar to or different from the optical waveguides 105A and 105B discussed above with respect to FIG. 1. A first optical fiber connection array 304 is provided on or in the optical waveguide 302. The first optical fiber connection array 304 may include, for example, an array of 12 or 24 different optical fiber lenses for receiving or transmitting light through the optical waveguide 302. In other words, light may pass through the optical fiber connection array 304 lenses from the top side or the bottom side.

As shown in FIG. 3A, a receptacle 306 is provided on top of the optical waveguide 302. Thus, in certain examples, the receptacle 306 is attached on the waveguide-integrated organic substrate 300 and is fixed thereto using, for example, an adhesive. In certain embodiments, the receptacle 306 includes alignment recesses 307 that are configured to receive alignment pins from a connector, as discussed in further detail below. The receptacle 306 also includes a second optical fiber connection array 308. The second optical fiber connection array 308 has the same number and pattern of lenses as the first optical fiber connection array 304 discussed above with respect to the optical waveguide 302.

As shown in FIG. 3A, a lid 312 is attached to the substrate 300 (e.g., using an adhesive). The lid 312 includes a first opening 322 that roughly corresponds to the dimensions of the receptacle 306 (the dimensions of the first opening 322 may be somewhat larger than the dimensions of the receptacle 306). The lid 312 also includes, for example, two adapter attachment holes 314. In this example, the adapter attachment holes 314 are on opposite sides of the first opening 322. As discussed in further detail below, the adapter attachment holes 314 are configured to receive plate springs 338 (or a first retainer) of an adapter 324 that are used to fix the adapter 324 to the lid 312.

As shown in FIG. 3A, a connector 350 with a third optical fiber connection array 382 including a plurality of lenses, and a fiber optic bundle 358 is provided. It should be appreciated that in this embodiment (as opposed to the embodiment discussed above with respect to FIGS. 2A-2J) the fiber optical bundle 358 is directly attached to the connector 350 rather than the adapter 324. The connector 350 include two studs 328 that fit into the alignment recesses 307 of the receptacle 306. As shown in the example of FIG. 3A, the studs 328 may have a tapered portion 329 that may allow the studs 328 to slide easier into the alignment recesses 307 of the receptacle 206. It should be appreciated that the studs 328 may have any suitable shape or profile that allows for ease of connection between the receptacle 306 and the connector 350, as well as allowing for fine alignment therebetween. Thus, the connector 350 with lens array and fiber optic bundle 358 is aligned with the receptacle 306 at the stud 328 periphery in the X-direction and the Y-direction, and at the bottom of the alignment recess 307 in the Z-direction. Thus, after the connector 350 is fitted to the receptacle 306 (i.e., by the studs 328 being inserted into the alignment recesses 307), a third optical fiber connection array 382 (i.e., which is a part of the connector 350) is aligned with the first optical fiber connection array 304 and the second optical fiber connection array 308. Thus, the lenses of the three optical fiber connection arrays are all aligned with each other to allow for light to pass from the optical waveguide 302, through the receptacle 306, and through the connector 350.

As shown in FIG. 3A, an adapter 324 is coupled to the connector 350 by a spring 354. The spring 354 provides a biasing force that urges the adapter 324 away from the connector 350 in the vertical Z-direction. However, the connector 350 includes a first connector protrusion 366 that protrudes outwardly from a main body portion of the connector 350, and the adapter 324 includes a first adapter protrusion 368 that protrudes inwardly. Thus, the adapter includes a first adapter protrusion 368 that overlaps with a first connector protrusion 366 in a lateral direction with respect to the plane of the semiconductor package. The adapter 324 has a cap like configuration that covers (or surrounds) a portion of the connector 350. The first connector protrusion 366 and the first adapter protrusion 368 are configured to overlap in the horizontal X-direction to inhibit the removal of the adapter 324 from the connector 350. As will be described in further detail with respect to FIG. 3I below, when the spring 354 is an extended configuration, the first adapter protrusion 368 will directly contact the first connector protrusion 366. Referring again to FIG. 3A, in certain embodiments, the connector 350 may include one or more connector spring protrusions 390, and the adapter 324 may include one or more adapter spring protrusions 392. The spring 354 may be coiled around the connector spring protrusions 390 and the adapter spring protrusions 392 to keep the spring 354 in place. The protrusions have a length that is configured to allow for a certain amount of movement of the adapter 324 to the connector 350 in the vertical Z-direction. As will be described in further detail below, the adapter 324 includes plate springs 338 that enable the adapter 324 to be removably attached to the lid 312. In alternative embodiments, the adapter 324 may be attached to the lid with screws (not shown) rather than plate springs 324. The plate springs 338 may include detents 394 that enable the adapter 324 to become removably fixed (or mounted or attached or engaged with) to the lid 312. In certain embodiments, the connector 350 is fixed in X, Y and Z-directions (i.e., pitching and rolling directions) by the force of the spring 354 between the connector 350 and the adapter 324. To remove the connector 350 and adapter 324 from the receptacle 306 and the substrate 300, the adapter is pulled upwards in the Z-direction until the detent 394 is pushed upward through the adapter attachment holes 314 to the release the structure.

Figure 3B:
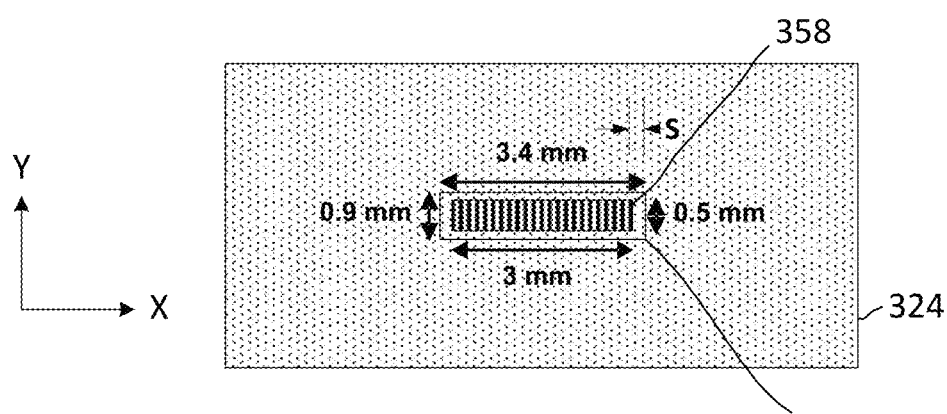
FIG. 3B is a top view of the adapter and the fiber optic bundle of FIG. 3A, according to embodiments.

Referring now to FIG. 3B, a top view is shown of the adapter 324 and the fiber optic bundle 358 depicted in FIG. 3A. As shown in FIG. 3B, the adapter 324 includes an adapter hole 396. In certain embodiments, the adapter hole 396 has length and width dimensions that are slightly larger than the length and width of the fiber optic bundle 358. In the example shown in FIG. 3B, the fiber optic bundle 358 has a length dimension in the X-direction of 3.0 mm and a width in the Y-direction of 0.5 mm. Also, the adapter hole has a length dimension in the X-direction of 3.4 mm and a width in the Y-direction of 0.9 mm. Therefore, there is a slit "S" (i.e., a gap) between the outer perimeter of the fiber optic bundle 358 and the inner perimeter of the adapter hole 396. To the extent that there may be a certain amount of warping of the substrate 300, the connector 350 can follow the substrate 300 warpage with the restoring force of the spring 354. Moreover, as shown in FIG. 3B, with regard to the connector 350 and the fiber optic bundle 358, any warpage of the substrate 300 in the X and Y-directions may be accommodated for because of the slit "S" between the adapter 324 and the connector 350 (i.e., which is attached to the fiber optic bundle 358). Therefore, substrate 300 movement due to warpage may be accounted for by the slit "S" to reduce or eliminate any misalignment of the various components of the optical connector device 301.

Figure 3C:
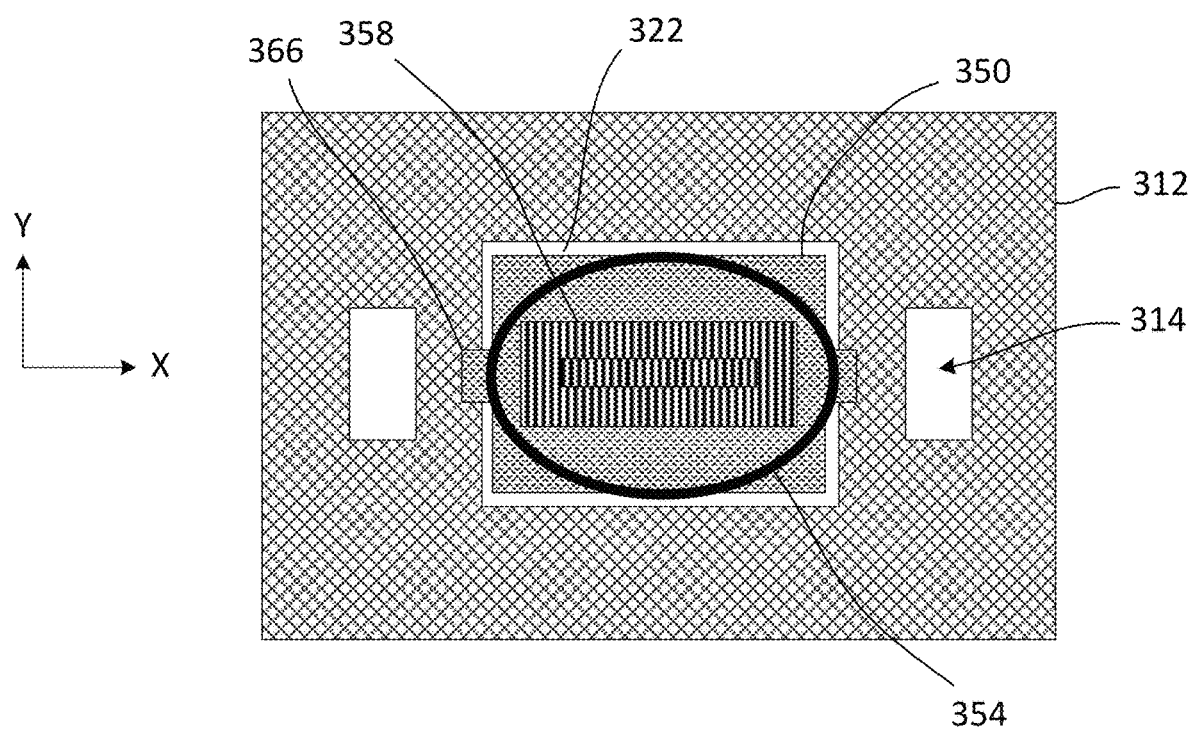
FIG. 3C is a top view of the connector and the lid of FIG. 3A, according to embodiments.

Referring now to FIG. 3C, a top view is shown of the connector 350 and the lid 312 depicted in FIG. 3A. As shown in FIG. 3C, the two adapter attachment holes 314 are formed on both sides of the first opening 322 of the lid 312. As discussed in detail above with regard to FIG. 3A, the adapter attachment holes 314 are sized and positioned to receive the plate springs 338 of the adapter 324. As discussed above, the connector 350 includes two first connector protrusions 366 on both sided of the connector 350. The spring 354 surrounds the fiber optic bundle 358.

Figure 3D:
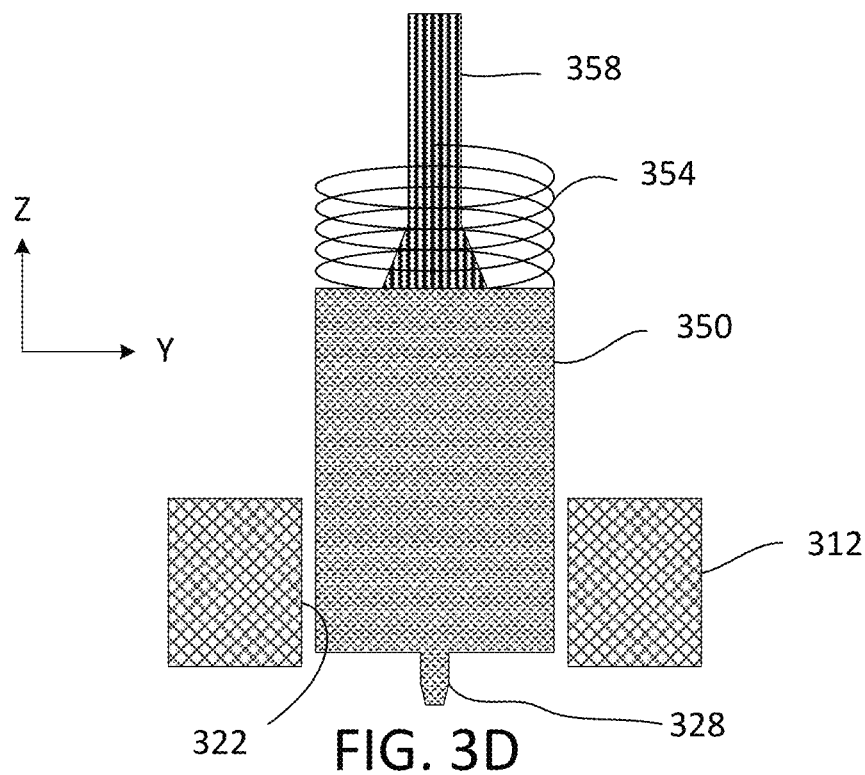
FIG. 3D is a side view of the connector and the lid of FIG. 3A, according to embodiments.
Figure 3E:
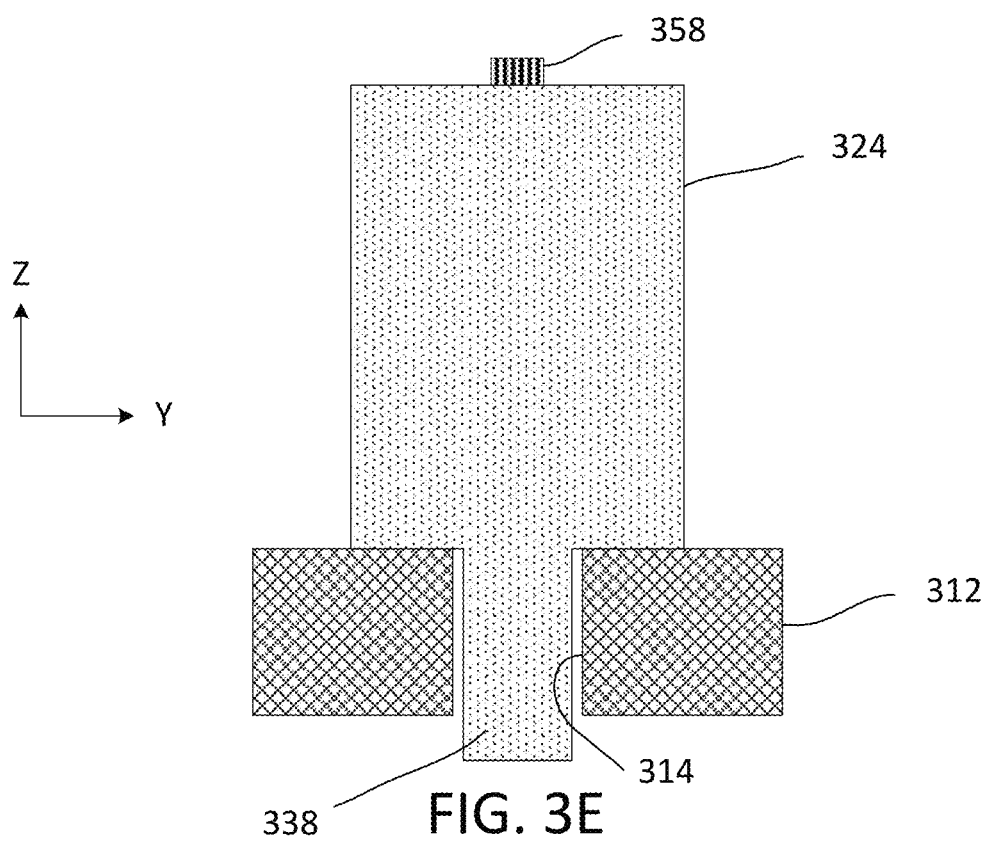
FIG. 3E is a side view of the adapter and the lid of FIG. 3A, according to embodiments.

Referring now to FIG. 3D, a side view of the connector 350 and the lid 312 is shown. FIG. 3E shows a side view of the adapter 324, the lid 312 and the fiber optic bundle 358. The connector is accommodated in the first opening 322 of the lid 312, as also shown in the cross-sectional side view of FIG. 3A.

Referring now to FIG. 3E, a side view of the adapter 324 and the lid 312 is shown. In this view, the adapter 324 surrounds (or covers) the connector 353 so that only the top portion of the fiber optic bundle 358 (i.e., which is attached to the connector 350) is protruding above the top surface of the adapter 324. The plate springs 338 of the adapter 324 are accommodated in the adapter attachment holes 314 of the lid 312, as also shown in the cross-sectional side view of FIG. 3A.

Figure 3F:
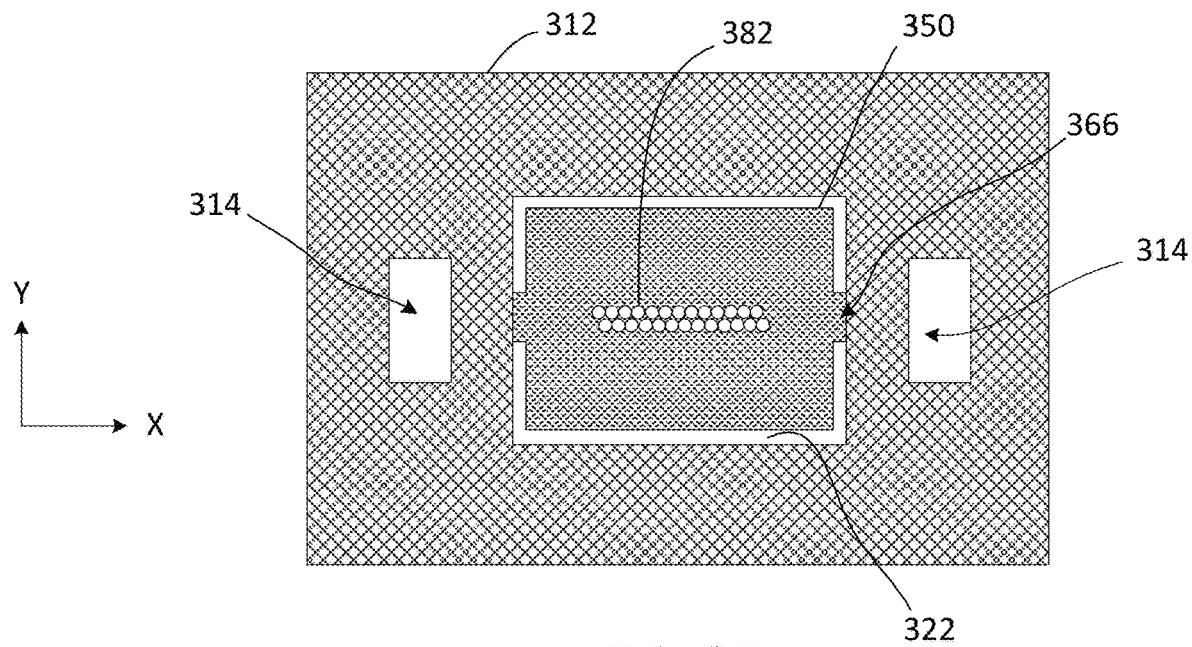
FIG. 3F is a bottom view of the connector and the lid of FIG. 3A, according to embodiments.

Referring now to FIG. 3F, a bottom view of the connector 350 and the lid 312 is shown. As described above, the lid 312 includes a first opening 322 and adapter attachment holes 314. The connector 350 is accommodated in the first opening 322 of the connector, and the connector includes the first connector protrusions 366 and the third optical fiber connection array 382.

Figure 3G:
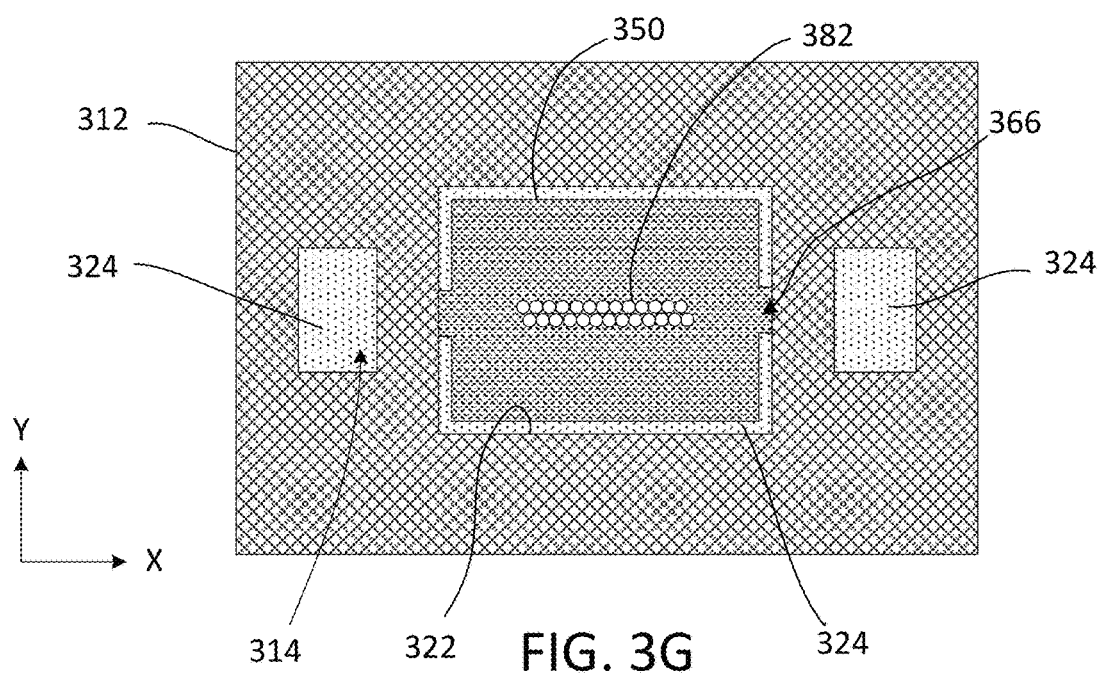
FIG. 3G is a bottom view of the connector, the lid and the adapter of FIG. 3A, according to embodiments.

Referring now to FIG. 3G, a bottom view of the connector 350, the lid 312 and the adapter 324 is shown. As described above, the lid 312 includes a first opening 322 and adapter attachment holes 314. The connector 350 is accommodated in the first opening 322 of the connector, and the connector includes the first connector protrusions 366 and the third optical fiber connection array 382. The adapter 324 is seen in the first opening 322 and the adapter attachment holes 314. Although not apparent from this bottom view in FIG. 3G, the detents 394 of the plate springs 338 of the adapter 324 are hooked onto the bottom surface of the lid 312, as also shown in FIG. 3J and as described below.

Figure 3H:
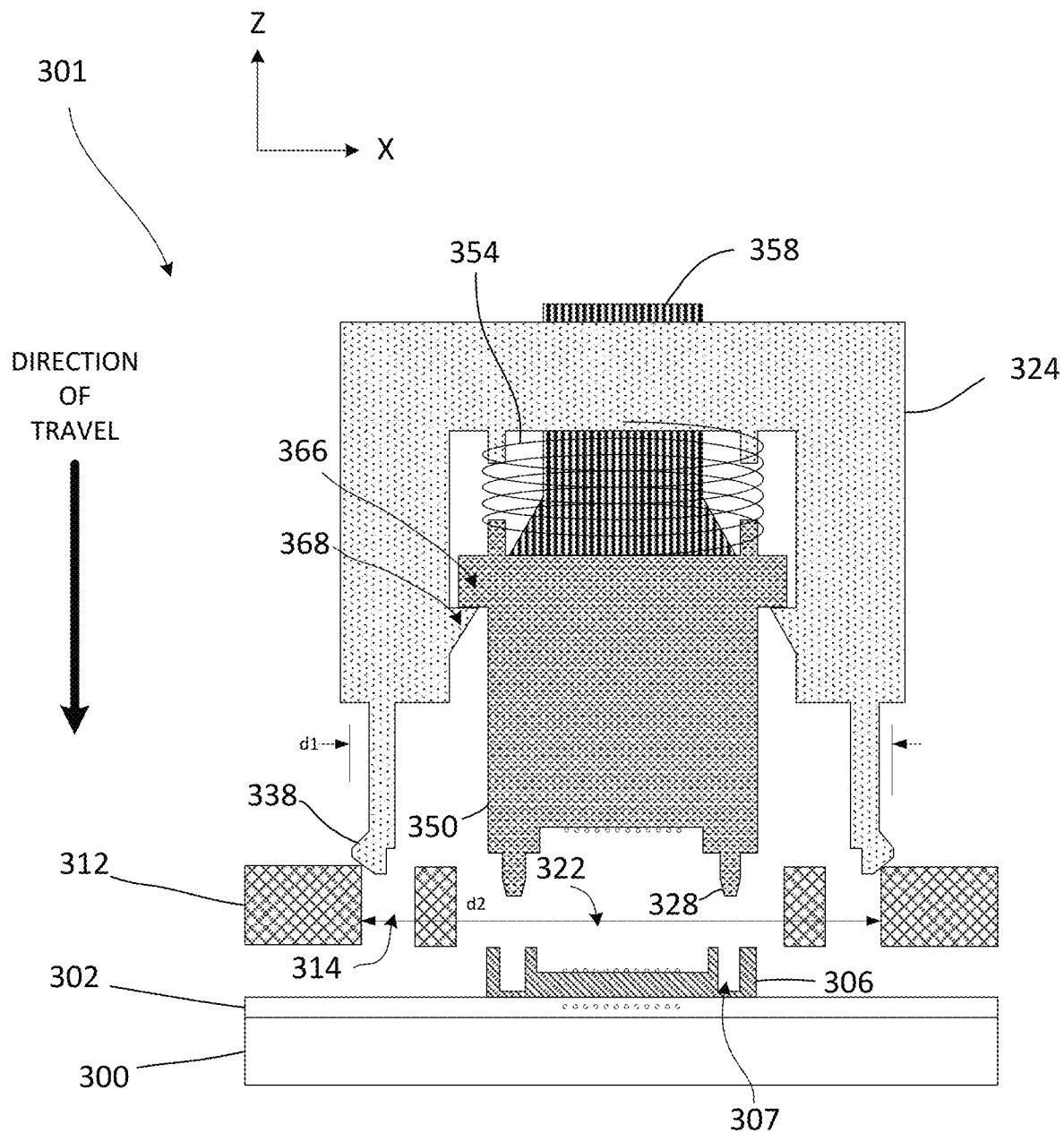
Figure 31:
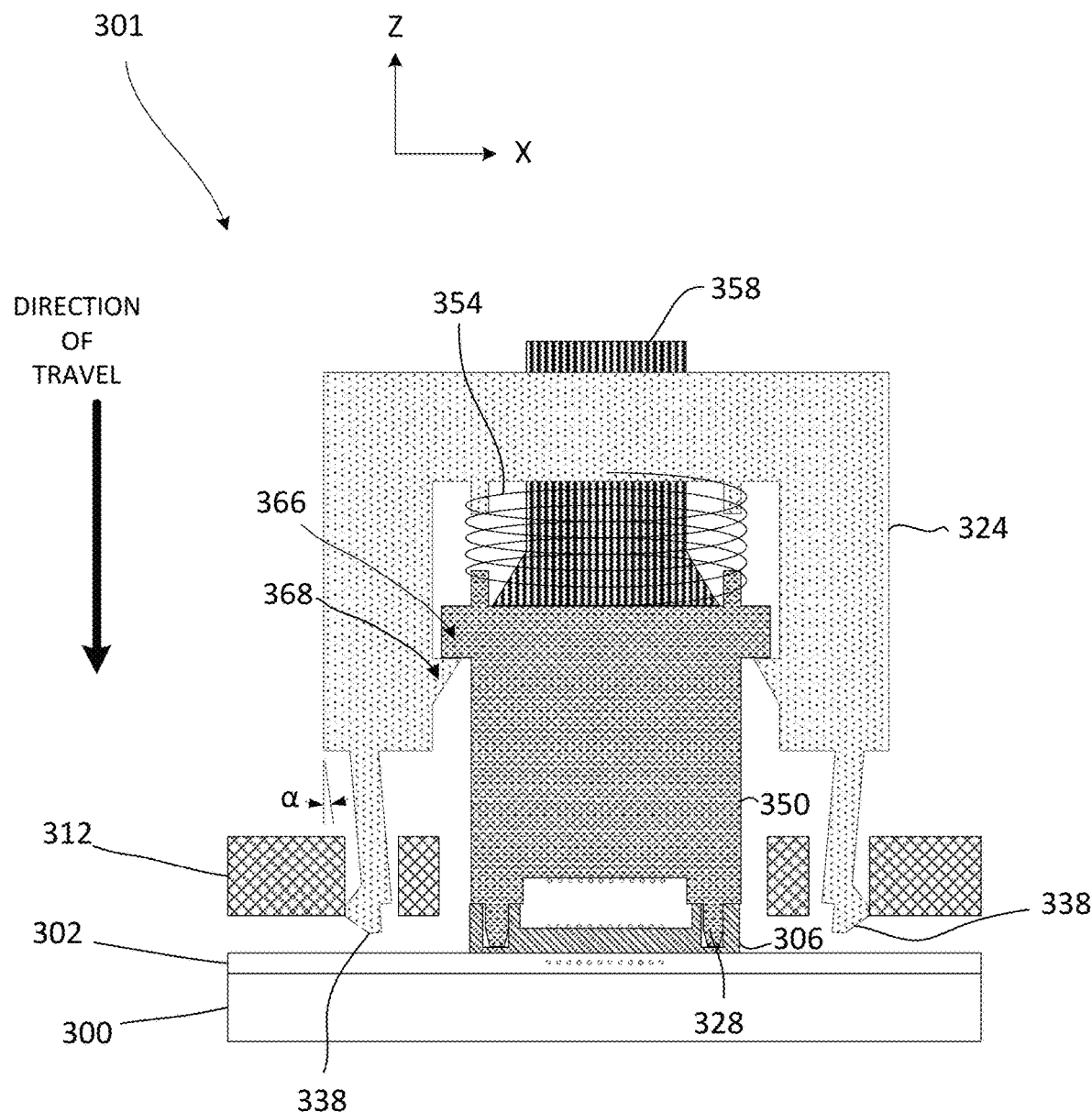
Figure 3J:
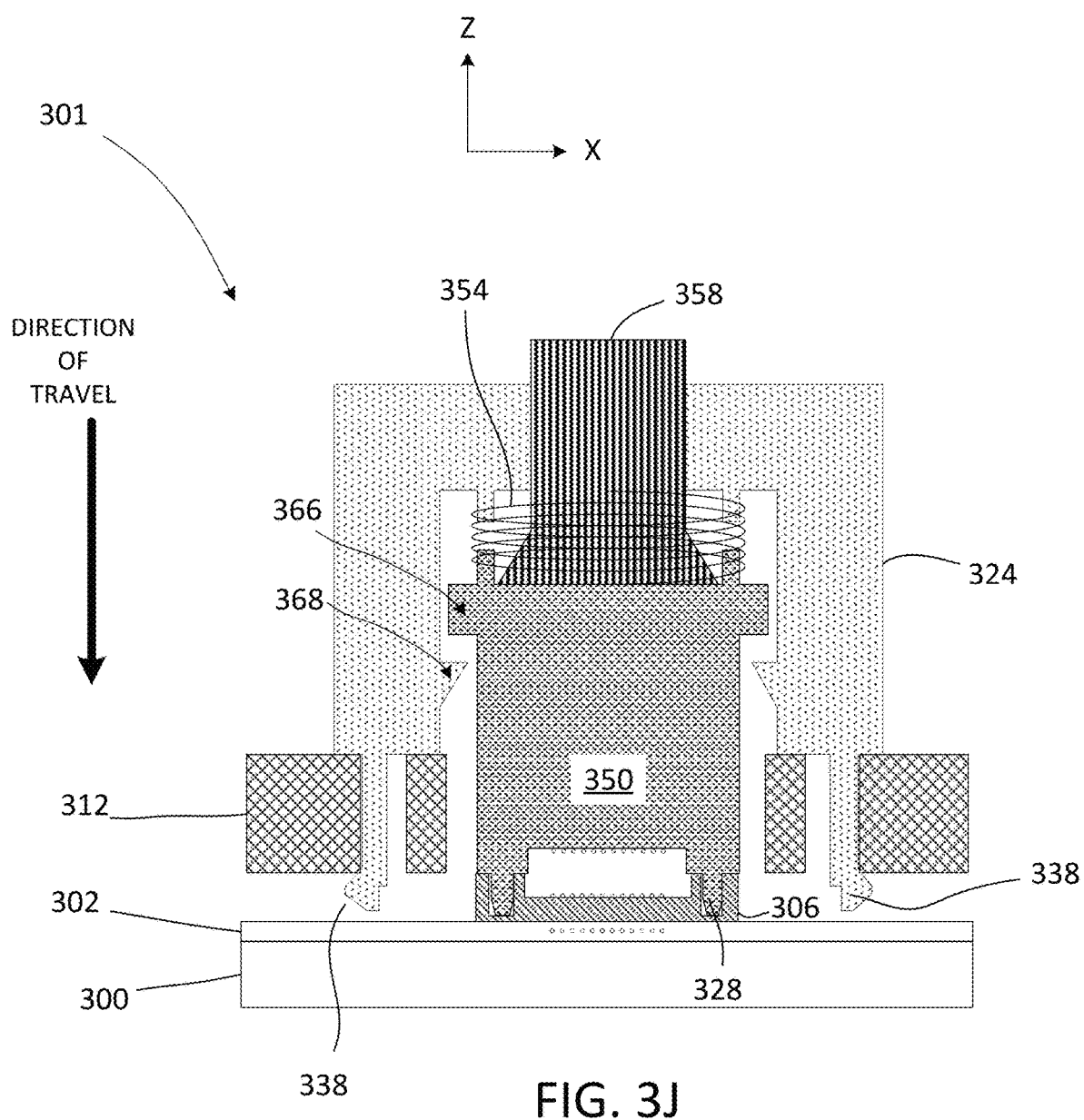

Referring now to FIGS. 3H-J, the attachment of the adapter 324 and the connector 350 to the lid 312 of the optical connector device 301 is shown in a series of steps. Certain elements of the optical connector device 301 discussed above with respect to FIGS. 3A-3I are omitted here for the sake of simplicity and for the ease of understanding. As shown in FIG. 3H, a first stage of the attachment of the adapter 324 and the connector 350 to the lid 312 is shown. In FIG. 3H, the adapter 324 and the connector 350 are moved in the direction of travel indicated by the arrow. At this stage, the spring 354 is expanded somewhat so that there is no gap between the first connector protrusion 366 of the connector 350 and the first adapter protrusion 368 of the adapter 324. In other words, because the adapter 324 and the connector 350 are movable with respect to each other, and because the spring 354 is urging these components apart, any gap that may exist between the first connector protrusion 366 of the connector 350 and the first adapter protrusion 368 of the adapter 324 is nonexistent. As shown in FIG. 3H, bottom detent portions of the plate springs 338 make contact with a top side of the lid 312. In certain embodiments, an outer dimension d1 of the plate springs 338 is greater than an outer dimension d2 of the adapter attachment holes 314.

Thus, as shown in FIG. 3I, as the adapter 324 and the connector 350 are moved further in the direction of travel, the plate springs 338 are forced to bend inwards by an angle α. As shown in FIG. 3I, the fine alignment of the connector 350 to the receptacle 306 is accomplished as the studs 328 are inserted into the alignment recesses 307 (see, FIG. 3H) of the receptacle 306. As soon as the bottom portions of the studs 328 contact the bottom of the alignment recesses 307, the connector 350 cannot move any further downward. However, because there is still a space between the bottom portion of the plate springs 338 and the top surface of the optical waveguide 302, the adapter 324 can travel further downward in the direction of travel.

Therefore, as shown in FIG. 3J, the adapter 324 is moved further downward in the direction of travel until the detent portion of the plate springs 338 pass the lower side of the lid 312, the spring 354 compresses a certain amount, and a gap is formed in the vertical Z-direction between the first connector protrusion 366 of the connector 350 and the first adapter protrusion 368 of the adapter 324. At this stage, the adapter 324 and the connector 350 are attached and fitted to the lid 312.

Figure 4:
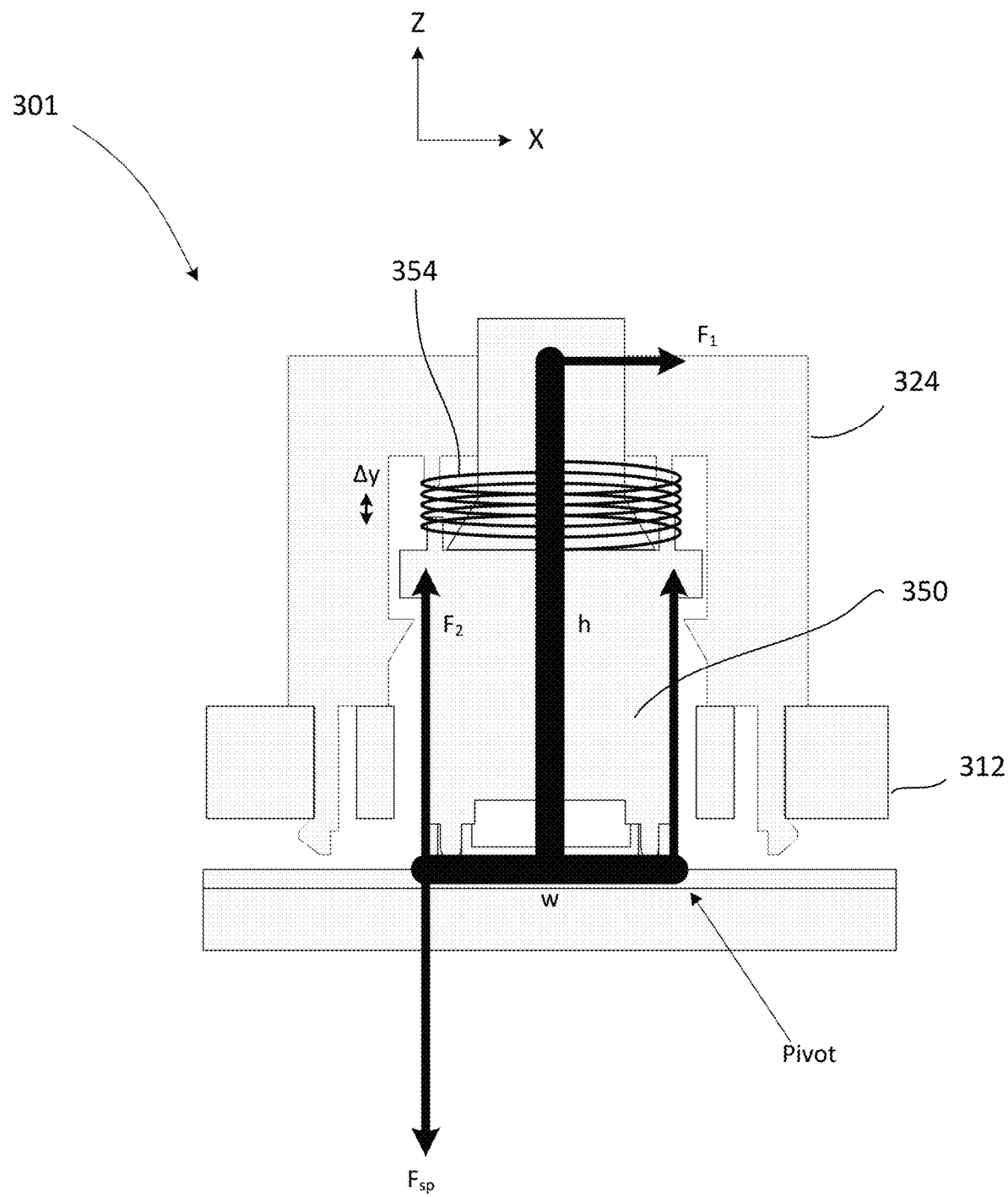
FIG. 4 is a force diagram that is applied to the optical connector device shown in FIG. 3A, according to embodiments.

In the embodiment shown with respect to FIGS. 3A-3J, a restoring force of the spring 354 that may be required to hold the components of the optical connector device 301 in place may be modeled as the forces that would be generated by torque on a rigid T-shaped bar, as shown in FIG. 4. In certain embodiments, the forces on the optical connector device 301 may be modeled as shown in FIG. 4 and as follows:

$$F_2 = \frac{h}{w}F_1, \text{ and}$$

$$F_{sp} = k\Delta y.$$

To hold the connector 350 in place, the following condition should be met:

$$F_{sp} > F_2.$$

Therefore, a desired spring has a spring constant k satisfying the following relationship:

$$k > \frac{h}{w}\frac{F_1}{\Delta y}.$$

In an example, where h=10 mm, w=1 mm, $F_1$=0.5N, and $\Delta y$=1 mm, the spring constant k would need to be greater than 5 N/mm to hold the connector 350 in place. In certain embodiments, the spring 354 may be a Belleville type spring or a disc type spring. However, it should be appreciated that any suitable type of spring may be used.

Figure 5:
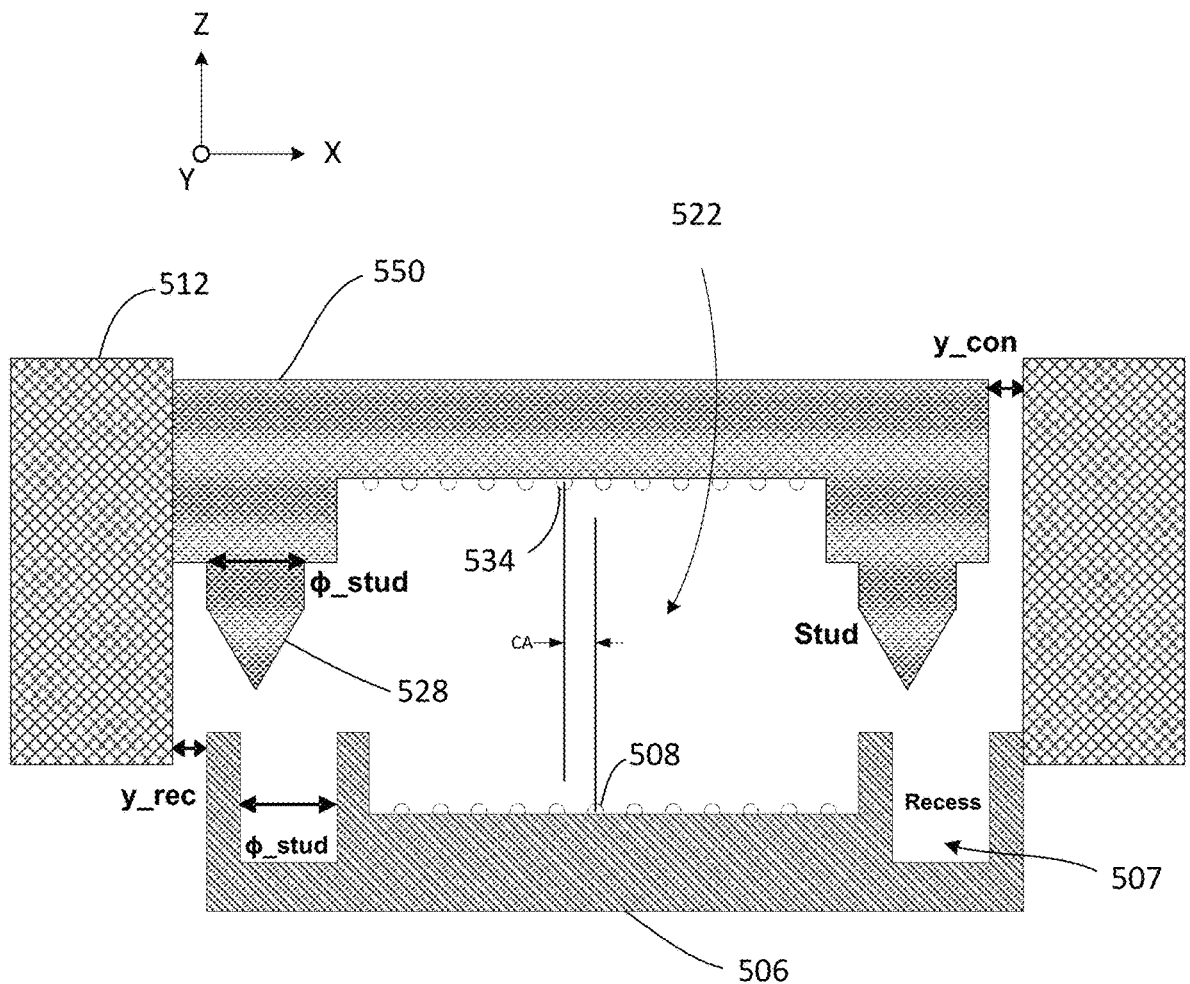
FIG. 5 a cross-sectional view of an optical connector device including a connector, an adapter, a lid, and a receptacle, according to embodiments.

Referring now to FIG. 5, a dimensional diagram of a connector 550 (or adapter depending on the embodiment described above) relative to a lid 512 and a receptacle 506 is shown. In certain embodiments, the receptacle 506 and the lid 512 meet the following conditions, so that so that when the connector 550 is fitted inside the lid hole 522 (i.e., coarse alignment), the stud 528 center is inside the recess circle 507 of the receptacle 506, and the stud center and the recess center are self-aligned automatically along the stud taper.

$$x_{con}+x_{rec}<\varphi_{stud}$$

$$y_{con}+y_{rec}<\varphi_{stud}$$

$\varphi_{stud}$: diameter of the stud.

$x_{con}$, $y_{con}$: gap between connector and lid in X, Y the directions, respectively.

$x_{rec}$, $y_{rec}$: gap between receptacle and lid in the X, Y directions, respectively.

It should be appreciated that although the shape of the stud 528 in FIG. 5 is a cone with a pillar, any other suitable shape may be used (e.g., a cone, a pyramid, etc.).

Referring now to FIGS. 6A-6C, a top view, a side view, and a cross-sectional view, respectively, of the adapter shown in FIG. 3A are shown, where the adapter 624 includes two separate sections that are attached together with screws 650. However, it should be appreciated that the adapter may be a single monolithic part, or it may comprise three or more separate parts that are attached together.

In certain embodiments, the optical connector device may have a high fixing strength and a high tolerance to warpage. In certain embodiments, the optical connector device has a stable and detachable fixture, and it may simplify the assembly process. For example, coarse alignment of the connector into the lid hole results in fine self-alignment with the receptacle. Also, the substrate used in the optical MCM may be a photoelectric composite substrate so that the fabrication process would be even more complicated if the adapter is fixed on the substrate. However, fixing the adapter on the lid adds only a lid with metal machining, and this is advantageous to reliability.

The descriptions of the various embodiments have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An optical connector device comprising:
    a semiconductor package including a receptacle and a lid, the receptacle including at least one receptacle alignment recess;
    an adapter attached to the lid of the semiconductor package; and
    a connector that is removably attached to the adapter,
    wherein the adapter includes
        a convex part extending from a first surface of the adapter and adapted to fit into an adapter opening of the lid,
        at least one alignment stud extending from the convex part and configured to fit into the at least one receptacle alignment recess,
        an adapter recess adapted to accommodate at least a portion of the connector, and
        a first retainer in the adapter recess to removably attach the connector to the adapter at a predetermined position, and
    wherein the connector includes
        an optical fiber array corresponding to the receptacle and extending in a vertical direction with respect to a primary horizontal plane of the semiconductor package, a second retainer used in conjunction with the first retainer, and a biasing member to bias a portion of the connector toward the semiconductor package.

2. The optical connector device according to claim 1, wherein the alignment stud has a tapered end.

3. The optical connector device according to claim 1, further comprising at least one guide pin that connects and aligns the connector to the adapter.

4. The optical connector device according to claim 1, wherein the connector includes a first portion a second portion that is movably coupled to the first portion.

5. The optical connector device according to claim 4, wherein the biasing member is a spring positioned between the first portion of the connector and the second portion of the connector, the spring adapted to bias the first portion of the connector away from the second portion of the connector in the vertical direction.

6. The optical connector device according to claim 1, wherein the first retainer is a plate spring that extends upward from a bottom of the adapter recess.

7. The optical connector device according to claim 1, wherein the first retainer is a plate spring that extends upward from a bottom of the adapter recess, and wherein the second retainer includes a detent that couples with a protrusion of the plate spring to removably attach the connector to the adapter.

8. The optical connector device according to claim 1, wherein the adapter is attached to the lid of the semiconductor package with a plurality of screws.

9. The optical connector device according to claim 1, wherein the connector includes a first optical lens array that corresponds to a pattern of the optical fiber array.

10. The optical connector device according to claim 9, wherein the adapter includes a second optical lens array that corresponds to the pattern of the optical fiber array, and a pattern of the first optical lens array.

11. The optical connector according to claim 10, wherein the adapter includes an adapter protrusion that overlaps with a connector protrusion in a lateral direction with respect to the plane of the semiconductor package.

* * * * *